(12) United States Patent
Murata et al.

(10) Patent No.: US 10,985,640 B2
(45) Date of Patent: Apr. 20, 2021

(54) VIBRATION MOTOR

(71) Applicant: Nidec Seimitsu Corporation, Ueda (JP)

(72) Inventors: Mitsuru Murata, Ueda (JP); Zendi Mori, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 153 days.

(21) Appl. No.: 16/371,178

(22) Filed: Apr. 1, 2019

(65) Prior Publication Data

US 2019/0312498 A1  Oct. 10, 2019

(30) Foreign Application Priority Data

Apr. 4, 2018 (JP) ............................. JP2018-072194

(51) Int. Cl.
*H02K 33/18* (2006.01)
(52) U.S. Cl.
CPC ................... *H02K 33/18* (2013.01)
(58) Field of Classification Search
CPC ..................................................... H02K 33/18
See application file for complete search history.

(56) References Cited

U.S. PATENT DOCUMENTS

| 8,097,991 | B2* | 1/2012 | Masami | ................. | H02K 33/16 310/29 |
| 8,669,679 | B2* | 3/2014 | Lee | ....................... | H02K 33/18 310/25 |
| 2012/0119595 | A1* | 5/2012 | Choi | ...................... | H02K 5/225 310/25 |
| 2015/0123499 | A1* | 5/2015 | Park | ....................... | H02K 33/16 310/25 |
| 2019/0068039 | A1* | 2/2019 | Chung | ................... | H02K 33/16 |

* cited by examiner

*Primary Examiner* — Naishadh N Desai
(74) *Attorney, Agent, or Firm* — Keating & Bennett

(57) ABSTRACT

A vibration motor includes a stationary portion including a casing, a substrate disposed above a bottom portion of the casing, and a coil disposed above the substrate and wound with a conductive wire in a circumferential direction, a vibrating body that includes a magnet and weight and that is supported so as to be capable of vibrating up and down with respect to the stationary portion, and an elastic member disposed between bottom and lower end portions of the vibrating body, in which a lead-out portion led out from the coil is connected to the substrate at a connection portion, a lower end portion of the weight includes at least one protrusion protruding downward, and the protrusion, as viewed in an axial direction, is disposed at a radial position on a radial-direction outer side of the lead-out portion and the connection portion and in a region overlapping the elastic member.

18 Claims, 5 Drawing Sheets

VIBRATION MOTOR

CROSS REFERENCE TO RELATED APPLICATION

This application claims the benefit of priority to Japanese Patent Application No. 2018-072194 filed on Apr. 4, 2018. The entire contents of this application are hereby incorporated herein by reference.

1. FIELD OF THE DISCLOSURE

The present disclosure relates to a vibration motor.

2. BACKGROUND

To date, various devices such as smartphones have been provided with a vibration motor. Among vibration motors, there is a type that vibrates in the horizontal direction and a type that vibrates in the vertical direction. A human being, which is a user, is more likely to sense vibration in the vertical direction than vibration in the horizontal direction. An example of an existing vertically vibrating linear vibration motor is disclosed in Japanese Unexamined Patent Application Publication No. 2013-85438.

The vibration motor of Japanese Unexamined Patent Application Publication No. 2013-85438 includes a fixing portion, a magnetic field portion, a substrate, a vibration portion, and an elastic member. The fixing portion has a case with a lower portion opened and a bracket for sealing an internal space of the case. The magnetic field portion has a magnet fixed on the bracket and a yoke plate fixed on the magnet. The vibration portion has a coil and a mass body. The substrate is fixed to a lower surface of the coil. The elastic member is disposed between the case and the vibration portion. The coil has an inner diameter larger than an outer diameter of the opposing magnet, and a portion of the magnet can be inserted into the space formed by the coil.

When the coil is energized via the substrate, the vibration portion vibrates in the vertical direction due to the interaction between the magnetic field generated in the coil and the magnetic field formed by the magnet.

In Japanese Unexamined Patent Application Publication No. 2013-85438, a conductive wire led out from the coil is connected to the substrate, but since the substrate and the elastic member are disposed at positions sandwiching the mass body in the vertical direction, there is almost no possibility that the conductive wire comes into contact with the elastic member even when the mass body moves greatly at the time of a drop impact when the vibration motor is accidentally dropped.

However, depending on the design of the vertical linear vibration type motor, there is still a possibility of the conductive wire coming into contact with the elastic member at the time of a drop impact and the conductive wire being affected.

SUMMARY

Accordingly, example embodiments of the present disclosure provide vibration motors that are each able to protect a lead wire led out from a coil at a time of a drop impact.

A vibration motor according to an example embodiment of the present disclosure includes a stationary portion including a casing, a substrate disposed above a bottom portion of the casing, and a coil disposed above the substrate and wound with a conductive wire in a circumferential direction, a vibrating body that includes a magnet and a weight and that is supported so as to be capable of vibrating in an up-down direction with respect to the stationary portion, and an elastic member disposed between the bottom portion and a lower end portion of the vibrating body, in which a lead-out portion led out from the coil is connected to the substrate at a connection portion, a lower end portion of the weight includes at least one protruding portion protruding downward, and the protruding portion, as viewed in an axial direction, is disposed at a radial-direction position on a radial-direction outer side of the lead-out portion and the connection portion and in a region overlapping with the elastic member.

The above and other elements, features, steps, characteristics and advantages of the present disclosure will become more apparent from the following detailed description of example embodiments with reference to the attached drawings.

DETAILED DESCRIPTION

Exemplary embodiments of the present disclosure will be described below with reference to the drawings. Further, the direction in which a center axis J of a vibration motor extends will be referred to as the "axial direction", and a direction along the axial direction will be referred to as the "up-down direction". Specifically, the upper side is denoted as X1 and the lower side is denoted as X2. In addition, a radial direction around the center axis J will be simply referred to as the "radial direction", and a circumferential direction around the center axis J will be simply referred to as the "circumferential direction". Further, the above "up-down direction" does not indicate a positional relationship or direction in the case of being incorporated in an actual device.

1. Overall Configuration of Vibration Motor

Figure 1:
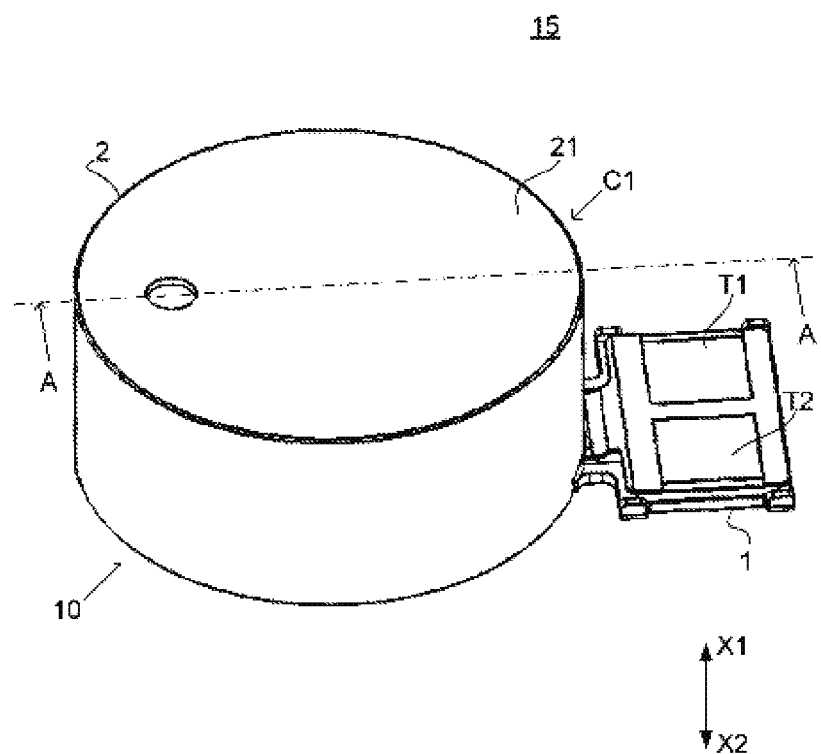
FIG. 1 is a perspective view illustrating an appearance of a vibration motor according to an example embodiment of the present disclosure.
Figure 2:
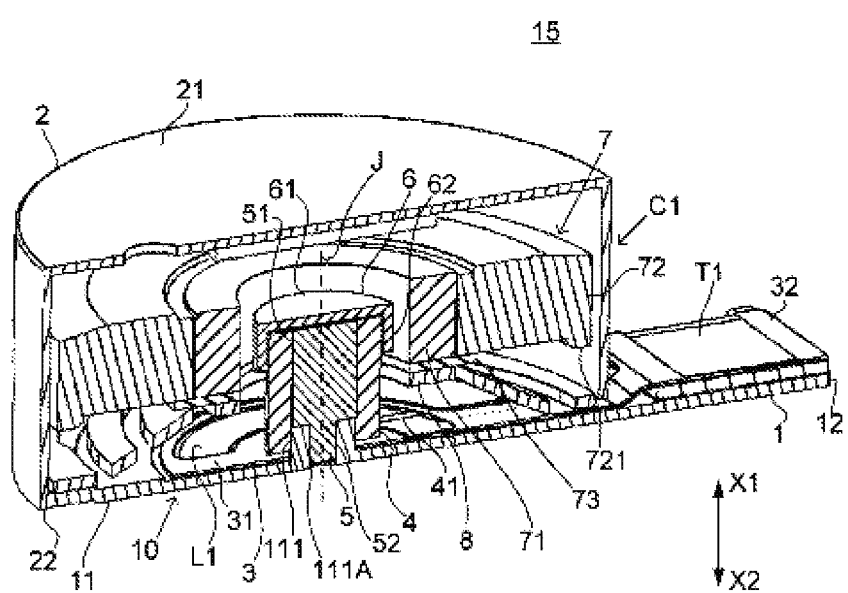
FIG. 2 is a cross-sectional perspective view taken along line I-I in FIG. 1.
Figure 3:
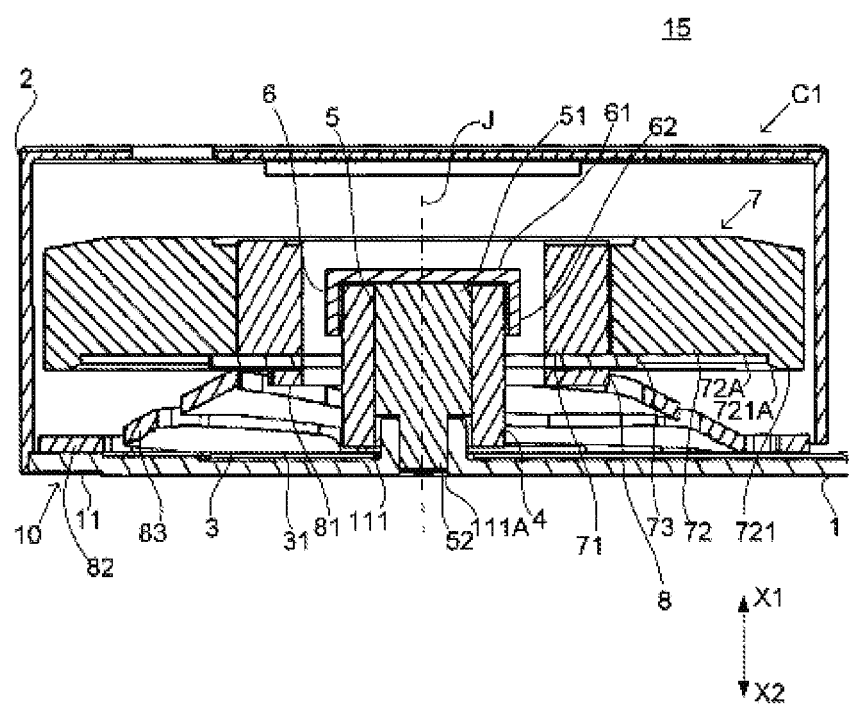
FIG. 3 is a partial sectional view taken along line I-I in FIG. 1.

FIG. 1 is a perspective view illustrating an appearance of a vibration motor 15 according to an example embodiment of the present disclosure. FIG. 2 is a cross-sectional perspective view taken along line I-I in FIG. 1. FIG. 3 is a partial cross-sectional view taken along line I-I in FIG. 1.

The vibration motor 15 mainly includes a stationary portion 10, a vibrating body 7, and an elastic member 8. The stationary portion 10 includes a casing C1, a substrate 3, a coil 4, a shaft 5, and a yoke portion 6.

The casing C1 includes a bottom portion 1 and a case 2. The bottom portion (base plate) 1 is a plate-like member formed of, for example, a cold-rolled steel plate. The bottom portion 1 expands in a direction perpendicular to the center axis J.

The case 2 is a cylindrical cover member including a lid portion 21 at an upper end thereof. That is, the case 2 has an opening portion 22 at a lower end thereof. The case 2 is formed of, for example, SUS material. The bottom portion 1 includes a first base portion 11 that is substantially disk-shaped and a second base portion 12 that is substantially rectangular-plate-shaped, and has a configuration in which the first base portion 11 and the second base portion 12 are connected in the radial direction. By fitting the opening portion 22 in the first base portion 11, the case 2 is attached to the bottom portion 1 from above, and the case 2 is fixed to the bottom portion 1 by welding, fusing, caulking or the like. The second base portion 12 is disposed outside the case 2. The substrate 3, the coil 4, the shaft 5, the yoke portion 6, the vibrating body 7, and the elastic member 8 are housed inside the casing C1.

The substrate 3 is a flexible printed circuit (FPC) having wiring for supplying current to the coil 4, and has a thickness in the up-down direction. The substrate 3 has flexibility and is fixed on the bottom portion 1 with an adhesive or an adhesive sheet. The substrate 3 includes a first substrate portion 31 that is substantially disk-shaped and a second substrate portion 32 that is substantially rectangular-plate-shaped, and has a configuration in which the first substrate portion 31 and the second substrate portion 32 are connected to each other in the radial direction. The first substrate portion 31 is disposed on the first base portion 11. The first substrate portion 31 includes a first land portion L1 and a second land portion L2 (illustrated in FIG. 5 to be described later). Each of the first land portion L1 and the second land portion L2 extends in an arc shape in the circumferential direction on the radial-direction outer side of the coil 4 and is exposed upward. A first lead-out portion 41 and a second lead-out portion 42 (illustrated in FIG. 5 to be described later) led out from the coil 4 are electrically connected to the first land portion L1 and the second land portion L2, respectively, by soldering or the like.

The second substrate portion 32 is disposed on the second base portion 12. The second substrate portion 32 includes a first terminal portion T1 and a second terminal portion T2 that are exposed upward. The first terminal portion T1 is connected to the first land portion L1 and the second terminal portion T2 is connected to the second land portion L2 by wiring. Thus, by applying a voltage between the first terminal portion T1 and the second terminal portion T2 from the outside, a current can be supplied to the coil 4.

Further, a more detailed configuration of the substrate 3 will be described later. In addition, it is also possible to use a rigid substrate having no flexibility as the substrate.

The shaft 5 has a columnar shape extending in the up-down direction centered on the center axis J, and includes a base portion 51 and a protruding portion 52. The shaft 5 is formed of, for example, cutting steel and has magnetism. The base portion 51 has a columnar shape extending in the up-down direction. The protruding portion 52 has a columnar shape protruding downward from the base portion 51. The diameter of the protruding portion 52 is smaller than the diameter of the base portion 51.

The first base portion 11 includes a fixing portion 111 protruding upward and centered on the center axis J. The fixing portion 111 penetrates the first substrate portion 31 in the up-down direction. The fixing portion 111 includes a through hole 111A penetrating in the up-down direction. The shaft 5 is fixed to the fixing portion 111 by fitting the protruding portion 52 into the through hole 111A and placing the base portion 51 on the fixing portion 111. Fixation of the shaft 5 is performed by press fitting or caulking at the place where the protruding portion 52 is fitted.

The coil 4 is formed by winding a conductor formed of, for example, a fused polyurethane copper wire around the center axis J along the up-down direction. The lower portion of the coil 4 is fitted to the radial-direction outer side of the fixing portion 111. A lower end surface of the coil 4 is fixed to the first substrate portion 31 with an adhesive or an adhesive sheet. The coil 4 is disposed on the radial-direction outer side of the shaft 5. The first lead-out portion 41 and the second lead-out portion 42 are conductive wires drawn from the coil 4.

The yoke portion (back yoke) 6 is formed of, for example, a cold-rolled steel plate and has magnetism. The yoke portion 6 includes a bottom portion 61 and a wall portion 62. The bottom portion 61 has a substantially disk-like shape having a thickness in the up-down direction.

The wall portion 62 has a cylindrical shape protruding downward from an outer edge of the bottom portion 61. That is, the inner circumferential surface of the wall portion 62 is located on the radial-direction outer side of the outer circumferential surface of the coil 4 and is opposed to the outer circumferential surface in the radial direction. The lower surface of the bottom portion 61 is fixed to an upper end surface of the base portion 51 with an adhesive or an adhesive sheet, whereby the yoke portion 6 is fixed to the shaft 5.

The vibrating body 7 includes a magnet 71, a weight 72, and a pole piece 73. The magnet 71 is formed of, for example, a sintered neodymium magnet, and has a cylindrical shape having an annular shape when viewed from above. The weight 72 is formed of, for example, a tungsten alloy and has a substantially cylindrical shape having an annular shape when viewed from above. The magnet 71 is disposed on the radial-direction inner side of the weight 72. The outer circumferential surface of the magnet 71 is fixed to the inner circumferential surface of the weight 72 with an adhesive or an adhesive sheet. The pole piece 73 is formed of, for example, SUS material and is an annular plate member having magnetism. The pole piece 73 is disposed on a lower side of the magnet 71 and fixed to a lower surface of the magnet 71 with an adhesive or an adhesive sheet.

Figure 4:
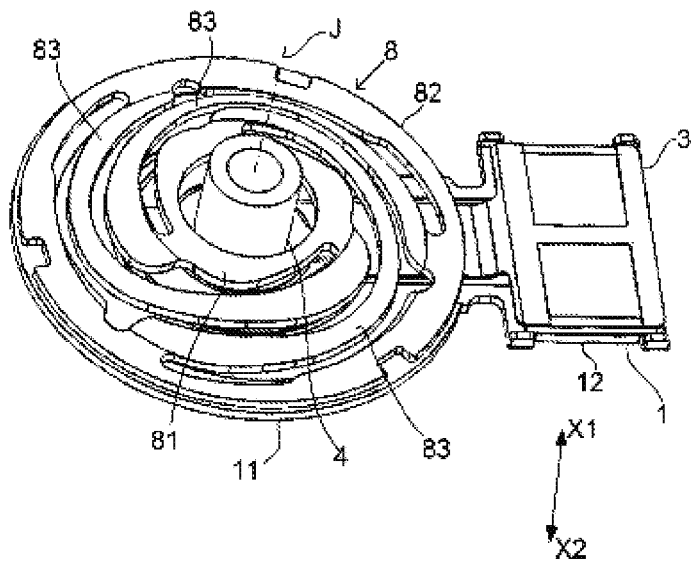
FIG. 4 is a perspective view illustrating a partial lower configuration of the vibration motor.

The elastic member 8 is a plate spring member formed of, for example, SUS material. Here, in order to illustrate the configuration of the elastic member 8, a perspective view illustrating a partial lower configuration of the vibration motor 15 is illustrated in FIG. 4. The elastic member 8 includes a first ring portion 81, a second ring portion 82 located below the first ring portion 81, and three ring connection portions 83 connecting the first ring portion 81 and the second ring portion 82 to each other. Three portions of the first ring portion 81, which are disposed at equal intervals in the circumferential direction at the outer edge of the first ring portion 81, which has an annular shape, are each connected to the inner edge of the second ring portion 82 by the ring connection portions 83 extending toward the radial-direction outer side and extending in the circumferential direction. With such a configuration, the elastic member 8 can expand and contract in the up-down direction.

The elastic member 8 is disposed between the vibrating body 7 and the first base portion 11. The coil 4 is disposed on the radial-direction inner side of the first ring portion 81. A lower surface of the second ring portion 82 is fixed to an upper surface of the first base portion 11 by welding or fusion, whereby the elastic member 8 is fixed to the bottom portion 1. An upper surface of the first ring portion 81 is fixed to a lower surface of the pole piece 73 by welding or fusion, whereby the elastic member 8 is fixed to the vibrating body 7.

As a result, the vibrating body 7 is supported by the elastic member 8 so as to be able to vibrate in the up-down direction. An inner circumferential surface of the magnet 71 is located on the radial-direction outer side of an outer circumferential surface of the yoke portion 6 and opposes the outer circumferential surface in the radial direction.

By supplying a current to the coil 4, a magnetic flux passing through a magnetic path formed of the coil 4, the shaft 5 and the yoke portion 6 is generated. The vibrating body 7 vibrates in the up-down direction by the interaction between the generated magnetic flux and the magnetic flux having the magnetic path formed by the magnet 71 and the pole piece 73. Therefore, the vibration motor 15 is a vertically vibrating linear vibration motor.

In particular, by configuring the yoke portion 6 so as to include the bottom portion 61 and the wall portion 62 as described above, the radial-direction distance between the yoke portion 6 and the magnet 71 is shortened, and because this short portion can be made longer in the up-down direction, the power of the vibration motor 15 can be increased. In this case, because it is not necessary to increase the thickness of the bottom portion 61, it is possible to suppress an increase in the size of the vibration motor 15 in the up-down direction. In addition, because it is not necessary to shorten the length of the coil 4 in the up-down direction, it is possible to suppress a decrease in the attraction force (reactance torque) caused by a decrease in the number of turns.

In addition, if the thickness of the yoke is large, the yoke cannot be manufactured by inexpensive press working, and becomes expensive because it uses machined components. On the other hand, in the case of the yoke portion 6 of the present example embodiment, it is not necessary to increase the thickness, so inexpensive press working can be used.

2. Configuration of Coil Fixing Structure

Figure 5:
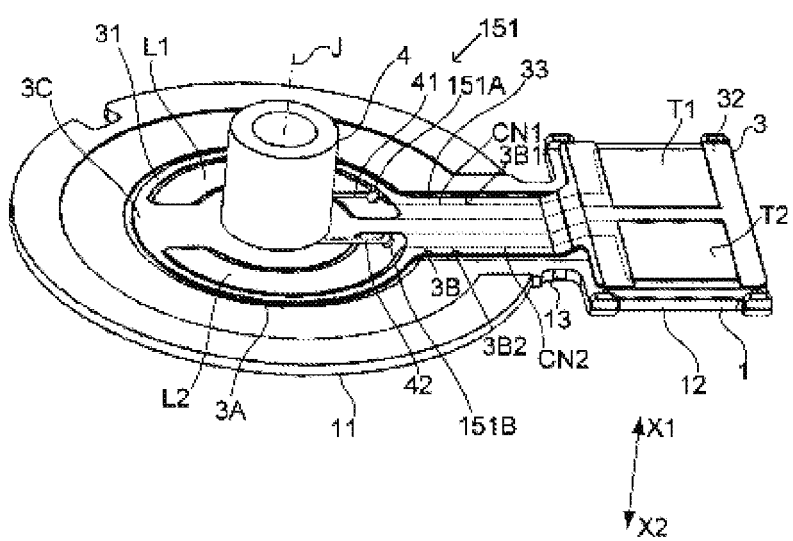
FIG. 5 is a perspective view illustrating a coil fixing structure.

Next, the coil fixing structure provided in the vibration motor 15 will be described. FIG. 5 is a perspective view illustrating a coil fixing structure 151 according to this example embodiment.

The coil fixing structure 151 includes the substrate 3 and the coil 4 and is disposed on the bottom portion 1. The bottom portion 1 includes the first base portion 11, the second base portion 12, and a connection base portion 13. The connection base portion 13 connects the first base portion 11 and the second base portion 12 to each other in the radial direction.

The substrate 3 has the first substrate portion 31, the second substrate portion 32, and a connection substrate portion 33. The connection substrate portion 33 has a band shape extending in the radial direction and connects the first substrate portion 31 and the second substrate portion 32 to each other in the radial direction. The coil 4 is fixed on the first substrate portion 31.

The substrate 3 includes, as a layered structure stacked in the up-down direction, a base film portion 3A, a conducting portion 3B, and an insulating portion 3C. The base film portion 3A is formed of, for example, polyimide and has insulating properties and flexibility. The conducting portion 3B is formed of, for example, a copper foil and is disposed on the base film portion 3A.

The conducting portion 3B includes a first wiring portion 3B1 and a second wiring portion 3B2. The first wiring portion 3B1 and the second wiring portion 3B2 are insulated. The first wiring portion 3B1 includes the first land portion L1, the first terminal portion T1, and a first connection wiring portion CN1. The second wiring portion 3B2 includes the second land portion L2, the second terminal portion T2, and a second connection wiring portion CN2.

The insulating portion 3C is a resist layer that is disposed on the conducting portion 3B and is formed of, for example, polyimide. The first land portion L1 and the second land portion L2 are included in the first substrate portion 31. Because the insulating portion 3C is not disposed above the first land portion L1 and the second land portion L2, the first land portion L1 and the second land portion L2 are exposed upward and electrical connection with the outside becomes possible.

Because the insulating portion 3C is not disposed above the first terminal portion T1 and the second terminal portion T2, the first terminal portion T1 and the second terminal portion T2 are exposed upward and electrical connection with the outside becomes possible. The first terminal portion T1 is connected to the first land portion L1 by the first connection wiring portion CN1. The second terminal portion T2 is connected to the second land portion L2 by the second connection wiring portion CN2. The insulating portion 3C is disposed above the first connection wiring portion CN1 and the second connection wiring portion CN2.

An end portion of the first lead-out portion 41 led out from the coil 4 is electrically connected to the first land portion L1 at a first connection portion 151A. An end portion of the second lead-out portion 42 led out from the coil 4 is electrically connected to the second land portion L2 at a second connection portion 151B. The second lead-out portion 42 is a winding start wire of the coil 4, and the first lead-out portion 41 is a winding finish wire of the coil 4. Electrical connection of the first lead-out portion 41 and the second lead-out portion 42 to the respective lands is performed by soldering or resistance welding.

3. Configuration of Weight

The state in which the elastic member 8 is fixed to the first base portion 11 in the above-described state of FIG. 5 is the state illustrated in FIG. 4 described above. Therefore, the elastic member 8 covers the first lead-out portion 41 and the second lead-out portion 42 of the coil 4, and the first connection portion 151A and the second connection portion 151B from the upper side. Therefore, in the present example embodiment, a configuration is realized in which the elastic member 8 is prevented from contacting the lead-out portion and the connection portion when the vibrating body 7 moves downward and the elastic member 8 is deformed at the time of a drop impact such as when the vibration motor 15 is accidentally dropped. Such a configuration will be described in detail below.

As illustrated in FIGS. 2 and 3, a lower end portion of the weight 72 has a protruding portion 721 protruding downward. The protruding portion 721 is formed along a radial-direction-outer-side edge of the lower end portion of the weight 72 and has an annular shape as viewed from above. That is, the protruding portion 721 is disposed over the entire circumference in the circumferential direction.

Figure 6:
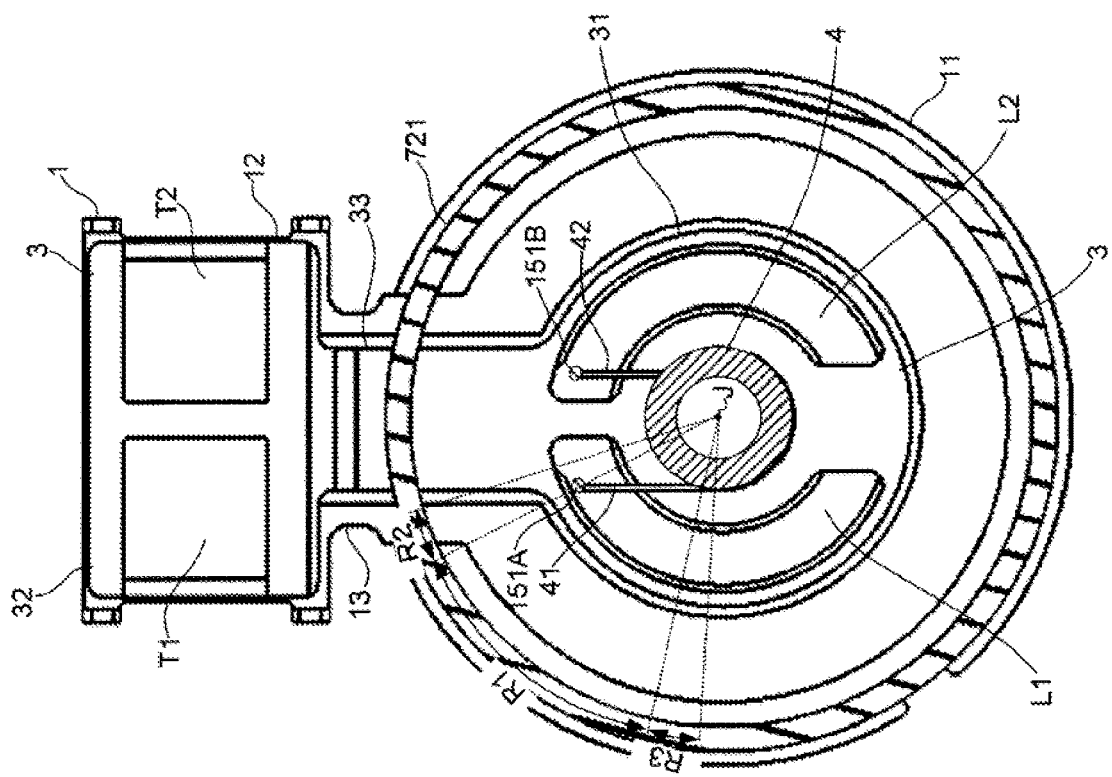
FIG. 6 is a cross-sectional top view illustrating a partial configuration of the vibration motor.

Here, FIG. 6 is a cross-sectional top view illustrating a state in which the vibration motor 15 is cut along a cutting plane perpendicular to the up-down direction at the up-down direction position of the protruding portion 721 of the weight 72 in a partial configuration of the vibration motor 15. FIG. 6 illustrates the bottom portion 1, the substrate 3, the coil 4, and the protruding portion 721. The protruding portion 721 illustrated in FIG. 6 is the lower surface of the protruding portion 721.

The protruding portion 721 overlaps with the second ring portion 82 of the elastic member 8 when viewed in the axial direction. That is, the protruding portion 721 overlaps the fixing portion where the elastic member 8 is fixed to the bottom portion 1. As a result, at the time of a drop impact in which the vibration motor 15 has been dropped, the vibrating body 7 moves downward and the elastic member 8 deforms, but since the protruding portion 721 comes into contact with the second ring portion 82, the downward movement of the vibrating body 7 is restricted. Therefore, the deformation of the first ring portion 81 and the ring connection portions 83 on the radial-direction inner side of the second ring portion 82 in the elastic member 8 is restricted, and the elastic member 8 is suppressed from coming into contact with the lead-out portions 41 and 42 and the connection portions 151A and 151B. Therefore, it is possible to protect the lead-out portions and the connection portions.

In other words, the protruding portion 721, as viewed in the axial direction, is disposed at a radial-direction position on the radial-direction outer side of the connection portions 151A and 151B and in a region overlapping with the second ring portion 82. More specifically, because the lead-out portions 41 and 42 are led out from the lower surface side of the coil 4, the protruding portion 721 is disposed at a radial-direction position on the radial-direction outer side of portions of the lead-out portions 41 and 42 other than the portions covered from above by the coil 4. The portions of the lead-out portions 41 and 42 other than the portions covered from above by the coil 4 are the portions illustrated as the lead-out portions 41 and 42 in FIG. 6.

As a result, even when the vibrating body 7 moves downward at the time of a drop impact, the movement of the vibrating body 7 is restricted by the contact of the protruding portion 721 with the second ring portion 82, deformation of the elastic member 8 located above the lead-out portions 41 and 42 and the connection portions 151A and 151B located on the radial-direction inner side of the protruding portion 721 is suppressed, and contact of the elastic member 8 with the lead-out portions 41 and 42 and the connection portions 151A and 151B is suppressed.

In particular, by providing the protruding portion 721 on the radial-direction outer side of the lower end portion of the weight 72, because the weight on the radial-direction outer side of the weight 72 can be increased, the vibration amount of the vibrating body 7 can be increased. In addition, it is also conceivable to form a protruding portion by using a damper instead of the protruding portion 721; however, because the number of members increases, it is preferable that the protrusion be formed on the weight as in the present example embodiment since an additional member is not necessary.

Further, the protruding portion 721 may be disposed in a region overlapping the ring connection portions 83 of the elastic member 8 when viewed in the axial direction. In this case, when the vibrating body 7 moves downward at the time of a drop impact, the protruding portion 721 comes into contact with the ring connection portions 83 as a movable portion, and the ring connection portions 83 are deformed. When the ring connection portions 83 are deformed to a certain extent, the deformation is restricted, and the movement of the vibrating body 7 is restricted. As a result, this suppresses deformation of the elastic member 8 located above the lead-out portions 41 and 42 and the connection portions 151A and 151B and suppresses the elastic member 8 from coming into contact with the lead-out portions 41 and 42 and the connection portions 151A and 151B. However, as described above, it is preferable that the protruding portion 721, as viewed in the axial direction, be disposed in a region overlapping with the second ring portion 82, which is a fixing portion, since deformation of the elastic member 8 is suppressed.

In addition, as illustrated in FIG. 6, a region that extends in the circumferential direction between a radial-direction position on a radial-direction line segment extending from the center axis J through the first lead-out portion 41 and a radial-direction position on a radial-direction line segment extending from the center axis J through the first connection portion 151A is defined as a first region R1. More specifically, a region corresponding to a portion of the first lead-out portion 41 other than the portion covered from above by the coil 4 is the first region R1.

Furthermore, a predetermined region extending in the circumferential direction adjacent to one end of the first region R1 in the circumferential direction is defined as a second region R2, and a predetermined region extending in the circumferential direction adjacent to the other end of the first region R1 in the circumferential direction is referred to as a third region R3.

A portion of the protruding portion 721 is disposed in an arcuate region including the first region R1 to the third region R3. As a result, the movement of the vibrating body 7 is restricted by the portion of the protruding portion 721 located in the arcuate region being brought into contact with the second ring portion 82, deformation of the elastic member 8 located above the first lead-out portion 41 and the first connection portion 151A is suppressed, and it is possible to more reliably protect the first lead-out portion 41 and the first connection portion 151A.

Further, the present disclosure is not limited to the configuration of the protruding portion 721 illustrated in FIG. 6 and any of various configurations may be adopted as long as at least a portion of the protruding portion is disposed in at least a portion of the region including the first region R1 to the third region R3. Therefore, for example, it may be an arcuate protruding portion disposed in all the regions of the first region R1 to the third region R3, or it may be an arcuate protruding portion disposed only in one or two regions out of the first region R1 to the third region R3.

In other words, including the configuration of the protruding portion 721 illustrated in FIG. 6, it is preferable that the protruding portion be located in the vicinity of the first lead-out portion 41 and the first connection portion 151A in the circumferential direction. Further, this also applies to the relationship between the protruding portion and the second lead-out portion 42 and the second connection portion 151B.

In addition, as illustrated in FIG. 3, the lower end portion of the vibrating body 7 includes the pole piece 73 on the radial-direction inner side of the protruding portion 721. The lower surface of the protruding portion 721 is located below the lower surface of the pole piece 73. As a result, because the protruding portion 721 comes into contact with the elastic member 8 first more reliably at the time of a drop impact, it is possible to more reliably protect the lead-out portions 41 and 42 and the connection portions 151A and 151B.

Furthermore, in a region on the radial-direction outer side of the pole piece 73 and on the radial-direction inner side of the protruding portion 721, a lower surface 72A of the weight 72 is located above the lower surface of the pole piece 73.

As a result, because the protruding portion 721 comes into contact with the elastic member 8 first more reliably at the time of a drop impact, it is possible to more reliably protect the lead-out portions 41 and 42 and the connection portions 151A.

In addition, as illustrated in FIG. 3, a chamfered shape 721A is formed at a lower tip end portion of the protruding portion 721. In FIG. 3, the chamfered shape 721A is a C-plane, but may be R or the like. As a result, it is possible to alleviate the concentration of stress generated in the protruding portion 721 when the protruding portion 721 comes into contact with the elastic member 8 at the time of a drop impact.

Furthermore, the chamfered shape 721A is provided on a radial-direction-inner-side edge of the lower tip end portion of the protruding portion 721. Thereby, it is possible to suppress interference by a radial-direction-inner-side edge of the protruding portion 721, which tends to interfere with the elastic member 8.

4. Modification Example of Protruding Portion

Because the protruding portion 721 is disposed over the entire circumference in the circumferential direction, the force applied to the elastic member 8 when the protruding portion 721 comes into contact with the elastic member 8 is dispersed, and the elastic member 8 can be protected.

Figure 7:
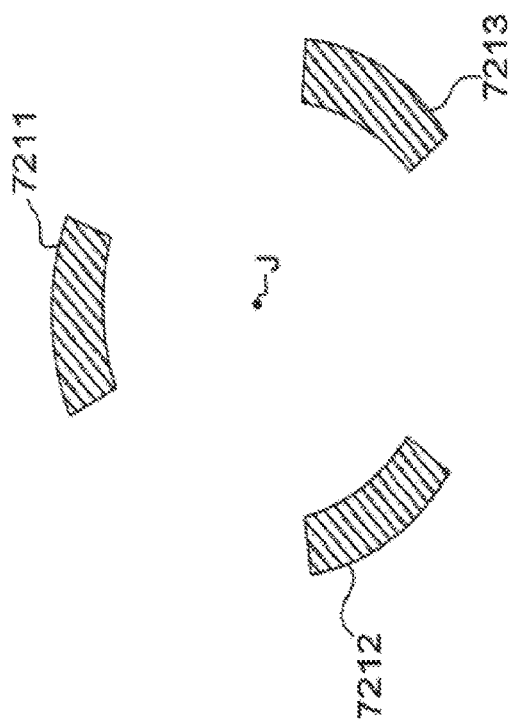
FIG. 7 is a cross-sectional top view illustrating protruding portions according to a modification example of the present disclosure.

However, regarding the protruding portion, the following modification example may be used. FIG. 7 is a cross-sectional top view illustrating protruding portions according to a modification example. FIG. 7 illustrates the lower surface of the protruding portions similarly to FIG. 6 described above.

In the configuration illustrated in FIG. 7, three protruding portions 7211, 7212, and 7213 are disposed in the circumferential direction. In this way, because a plurality of protruding portions are disposed, the force applied to the elastic member 8 when the protruding portions come into contact with the elastic member 8 is dispersed, and the elastic member 8 can be protected.

In addition, the protruding portions 7211, 7212, and 7213 are disposed at equal intervals in the circumferential direction. That is, the protruding portions 7211, 7212, and 7213 are disposed at intervals of 120° in the circumferential direction. As a result, the vibrating body 7 is prevented from tilting when the protruding portions come into contact with the elastic member 8.

Further, the number of protruding portions is not limited to three, but an arbitrary number of two or more protruding portions can be provided. In addition, at least one of the plurality of protruding portions is desirably disposed in at least a portion of a region including the first region R1 to the third region R3 illustrated in FIG. 6. In addition, it is also desirable to form the chamfered shape described above in each of the plurality of protruding portions.

5. Operational Effect According to Present Example Embodiment

As described above, the vibration motor 15 according to the present example embodiment includes the stationary portion 10 including the casing C1, the substrate 3 disposed above the bottom portion 1 of the casing C1, and the coil 4 disposed above the substrate 3 and wound with a conductive wire in the circumferential direction; the vibrating body 7 including the magnet 71 and the weight 72 and supported so as to be capable of vibrating in the up-down direction with respect to the stationary portion 10; and the elastic member 8 disposed between the bottom portion 1 and the lower end portion of the vibrating body 7. The lead-out portions 41 and 42 led out from the coil 4 are connected to the substrate 3 at the connection portions 151A and 151B, the lower end portion of the weight 72 includes the protruding portion 721 protruding downward, and the protruding portion 721 is, as viewed in the axial direction, disposed at a radial-direction position on the radial-direction outer side of the lead portions 41 and 42 and the connection portions 151A and 151B in a region overlapping with the elastic member 8.

Thus, deformation of the elastic member located above the lead-out portions and the connection portions located on the radial-direction inner side of the protruding portion is suppressed and contact between the elastic member and the conductive wire and connection portions of the coil is suppressed by the protruding portion moving downward and coming into contact with the elastic member at the time of a drop impact. Consequently, the conductive wire and the connection portion can be protected.

In addition, the protruding portion 721 is located in the vicinity of the lead-out portions 41 and 42 and the connection portions 151A and 151B in the circumferential direction.

Thereby, it is possible to further suppress the elastic member from contacting the conductive wire and the connection portions, and it is possible to more reliably protect the conductive wire and the connection portions.

In addition, the protruding portion 721, as viewed in the axial direction, overlaps the fixing portion (the second ring portion 82) where the elastic member 8 is fixed to the bottom portion 1.

As a result, because the protruding portion comes into contact with the fixing portion of the elastic member at the time of a drop impact, deformation of the elastic member can be suppressed.

In addition, the lower end portion of the vibrating body 7 has the pole piece 73 on the radial-direction inner side of the protruding portion 721, and the lower surface of the protruding portion 721 is located below the lower surface of the pole piece 73.

Thus, because the protruding portion first comes into contact with the elastic member more reliably at the time of a drop impact, the conductive wire and the like can be protected more reliably.

In addition, the lower surface 72A of the weight 72 is located above the lower surface of the pole piece 73 in a region on the radial-direction outer side of the pole piece 73 and on the radial-direction inner side of the protruding portion 721.

As a result, because the protruding portion first comes into contact with the elastic member more reliably at the time of a drop impact, the conductor or the like can be protected more reliably.

In addition, the protruding portion 721 is disposed over the entire circumference in the circumferential direction. As a result, the force applied to the elastic member when the protruding portion comes into contact with the elastic member is dispersed, and the elastic member can be protected.

In addition, a plurality of the protruding portions 7211, 7212, and 7213 are disposed in the circumferential direction. As a result, the force applied to the elastic member when the protruding portions come into contact with the elastic member is dispersed, and the elastic member can be protected.

In addition, the protruding portions 7211, 7212, and 7213 are disposed at equal intervals in the circumferential direction. As a result, inclination of the vibrating body when the protruding portions come into contact with the elastic member is suppressed.

In addition, the chamfered shape 721A is provided at the lower tip end portion of the protruding portion 721. This makes it possible to alleviate the concentration of stress generated in the protruding portion when the protruding portion comes into contact with the elastic member.

In addition, the chamfered shape 721A is provided on the radial-direction-inner-side edge of the lower tip portion. Thereby, it is possible to suppress interference by the radial-direction-inner-side edge which tends to interfere with the elastic member at the protruding portion.

6. Other

Although the example embodiments of the present disclosure have been described above, various modifications can be made to the example embodiment as long as they are within the scope of the gist of the present disclosure.

INDUSTRIAL APPLICABILITY

The present disclosure can be used for a vibration motor provided in, for example, a smartphone, a wearable device, or the like.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A vibration motor comprising:
   a stationary portion including a casing, a substrate disposed above a bottom portion of the casing, and a coil disposed above the substrate and wound with a conductive wire in a circumferential direction;
   a vibrating body that includes a magnet and a weight and that is supported so as to be capable of vibrating in an up-down direction with respect to the stationary portion; and
   an elastic member disposed between the bottom portion and a lower end portion of the vibrating body; wherein
   a lead-out portion led out from the coil is connected to the substrate at a connection portion;
   a lower end portion of the weight includes at least one protruding portion protruding downward; and
   the at least one protruding portion, as viewed in an axial direction, is disposed at a radial-direction position on a radial-direction outer side of the lead-out portion and the connection portion and in a region overlapping with the elastic member.

2. The vibration motor according to claim 1, wherein the at least one protruding portion is located in a vicinity of the lead-out portion and the connection portion in the circumferential direction.

3. The vibration motor according to claim 1, wherein the at least one protruding portion, as viewed in the axial direction, overlaps with a fixing portion where the elastic member is fixed to the bottom portion.

4. The vibration motor according to claim 1, wherein
   the lower end portion of the vibrating body includes a pole piece on a radial-direction inner side of the at least one protruding portion; and
   a lower surface of the at least one protruding portion is located below a lower surface of the pole piece.

5. The vibration motor according to claim 2, wherein
   the lower end portion of the vibrating body includes a pole piece on a radial-direction inner side of the at least one protruding portion; and
   a lower surface of the at least one protruding portion is located below a lower surface of the pole piece.

6. The vibration motor according to claim 4, wherein a lower surface of the weight is located above the lower surface of the pole piece in a region on a radial-direction outer side of the pole piece and on the radial-direction inner side of the at least one protruding portion.

7. The vibration motor according to claim 1, wherein the at least one protruding portion is disposed over an entire circumference in the circumferential direction.

8. The vibration motor according to claim 2, wherein the at least one protruding portion is disposed over an entire circumference in the circumferential direction.

9. The vibration motor according to claim 6, wherein the at least one protruding portion is disposed over an entire circumference in the circumferential direction.

10. The vibration motor according to claim 1, wherein a plurality of the protruding portions are disposed in the circumferential direction.

11. The vibration motor according to claim 2, wherein a plurality of the protruding portions are disposed in the circumferential direction.

12. The vibration motor according to claim 6, wherein a plurality of the protruding portions are disposed in the circumferential direction.

13. The vibration motor according to claim 10, wherein the protruding portions are disposed at equal intervals in the circumferential direction.

14. The vibration motor according to claim 1, wherein a chamfered shape is provided at a lower tip end portion of the at least one protruding portion.

15. The vibration motor according to claim 2, wherein a chamfered shape is provided at a lower tip end portion of the at least one protruding portion.

16. The vibration motor according to claim 6, wherein a chamfered shape is provided at a lower tip end portion of the at least one protruding portion.

17. The vibration motor according to claim 13, wherein a chamfered shape is provided at a lower tip end portion of the at least one protruding portion.

18. The vibration motor according to claim 14, wherein the chamfered shape is provided on a radial-direction-inner-side edge of the lower tip end portion.

* * * * *